(12) United States Patent
Chang et al.

(10) Patent No.: US 9,341,892 B2
(45) Date of Patent: May 17, 2016

(54) BACK PLATE, BACKLIGHT MODULE USING THE BACK PLATE AND DISPLAY DEVICE USING THE SAME

(71) Applicant: Forhouse Corporation, Taichung (TW)

(72) Inventors: Chia-Hsin Chang, Taoyuan (TW); Feng-Chang Chang, Taoyuan (TW)

(73) Assignee: DARWIN PRECISIONS CORPORATION, Taichung (TW)

( * ) Notice: Subject to any disclaimer, the term of this patent is extended or adjusted under 35 U.S.C. 154(b) by 0 days.

(21) Appl. No.: 14/328,822

(22) Filed: Jul. 11, 2014

(65) Prior Publication Data

US 2015/0016091 A1  Jan. 15, 2015

(30) Foreign Application Priority Data

Jul. 12, 2013  (TW) ............................. 102125061 A

(51) Int. Cl.
| | | |
|---|---|---|
| *G09F 13/04* | (2006.01) | |
| *G09F 13/08* | (2006.01) | |
| *G02F 1/1335* | (2006.01) | |
| *G02F 1/1333* | (2006.01) | |

(52) U.S. Cl.
CPC .... *G02F 1/133608* (2013.01); *G02F 1/133308* (2013.01); *G02F 2001/133314* (2013.01); *G02F 2001/133328* (2013.01)

(58) Field of Classification Search
CPC ............... G02F 1/133608; G02F 1/133602; G02F 1/133308; G02F 2001/133328; G02F 2001/133314
See application file for complete search history.

(56) References Cited

U.S. PATENT DOCUMENTS

| | | | |
|---|---|---|---|
| 2005/0195620 A1 | 9/2005 | Hwang et al. | |
| 2010/0302457 A1* | 12/2010 | Yamamoto | ........ G02F 1/133308 348/725 |
| 2011/0007230 A1* | 1/2011 | Yamamoto et al. | ........... 348/794 |
| 2013/0107156 A1* | 5/2013 | Zhou | .............. 349/58 |
| 2014/0139783 A1* | 5/2014 | Tang | .............. 349/58 |

FOREIGN PATENT DOCUMENTS

| | | |
|---|---|---|
| CN | 101761834 A | 6/2010 |
| CN | 101952643 A | 1/2011 |

OTHER PUBLICATIONS

English translation of abstract of CN 101761834 A (published Jun. 30, 2010).

* cited by examiner

*Primary Examiner* — Donald Raleigh
(74) *Attorney, Agent, or Firm* — Muncy, Geissler, Olds & Lowe PC

(57) ABSTRACT

The present provides a back plate including a plate and a side wall. The side wall extends out from an edge of the plate, wherein the side wall includes a wall body, a first bending sheet, and a second bending sheet. The first bending sheet is formed by bending outward from a top end of the wall body along a first rotating direction. The second bending sheet is formed by bending an end of the first bending sheet that is away from the top end of the wall body inward along a second rotating direction contrary to the first rotating direction, wherein at least a portion of the second bending sheet overlaps the first bending sheet. The second bending sheet includes a fixing part disposed on a face of the second bending sheet that faces away from the first bending sheet.

15 Claims, 8 Drawing Sheets

BACK PLATE, BACKLIGHT MODULE USING THE BACK PLATE AND DISPLAY DEVICE USING THE SAME

BACKGROUND OF THE DISCLOSURE

1. Field of the Disclosure

This disclosure generally relates to a back plate, a backlight module using the back plate and a display device using the same.

2. Background

Recently, the demand of LCD displays increases rapidly due to thin thickness, light weight, high portability, and low radiation of LCD panel in comparison with CRT displays. For large panel type, to show difference and reducing manufacturing cost for lowering the price, direct backlight design is commonly used. Besides, the thickness is properly increased, wherein the number of light source or optical films is decreased. On the other hand, the back plate is used as an external appearance part to decrease the volume of the plastic back cover, wherein an effect of reducing local thickness can also be achieved. However, narrow border types are main stream in the market, even the low price products are desired to have narrow border for better sale.

Tapping and/or bulkhead structures are not easily designed for using the back plate as an external appearance part. In present, rivets are used to fix inner units such as plastic bars and metal parts. More particularly, rivets are driven into the back plate from the back side to fix the plastic bars and metal parts, and further clamps the panel and the optical films. However, this approach increases the cost. Moreover, rivets are still visible in the back side of the back plate and are not able to be fully hidden from the view even a higher-cost rear spray coating is used, hence the aesthetic perception of the appearance is affected.

SUMMARY

In accordance with aspects of the present disclosure, a back plate for use with a backlight module having better aesthetic perception of the appearance is provided.

In accordance with embodiments of the present disclosure, a back plate for use with a backlight module is provided, wherein the position of a wall body of the back plate can be disposed more outward to prevent an overlapping of the projections of a visible area and the wall body in a direction vertical to a plate of the back plate.

The back plate includes a plate and a side wall. The side wall extends out from an edge of the plate, wherein the side wall includes a wall body, a first bending sheet, and a second bending sheet. A first angle is included between the wall body and the plate. The first bending sheet is formed by bending outward from a top end of the wall body along a first rotating direction, wherein a second angle is included between the first bending sheet and the wall body. The second bending sheet is formed by bending an end of the first bending sheet that is away from the top end of the wall body inward along a second rotating direction contrary to the first rotating direction, wherein the second bending sheet is substantially parallel to the first bending sheet and at least a portion of the second bending sheet overlaps the first bending sheet. The second bending sheet includes a fixing part disposed at the portion of the second bending sheet overlapping the first bending sheet and on a face of the second bending sheet that faces away from the first bending sheet.

The fixing part protrudes outward from the face of the second bending sheet that faces away from the first bending sheet. The first angle is 90° or obtuse. The second angle is 90° or obtuse. The wall body is substantially a continuous wall surrounding the plate. The wall body includes non-continuous walls disposed in pair on two opposite sides of the plate.

The present disclosure also provides a backlight module comprising the above described back plate and a light source module disposed on the plate. The backlight module further includes an optical film disposed on a face of the second bending sheet that faces away from the first bending sheet, wherein a side edge of the optical film extends outward and beyond the wall body. The display device of the present disclosure includes the above mentioned backlight module and a panel disposed on a face of the optical film that faces away from the second bending sheet, wherein a side edge of the panel extends outward and beyond the wall body. The display device further includes a casing part surrounding the back plate, wherein the casing part is fixed on the second bending sheet by the fixing part, wherein the panel is disposed between the casing part and the second bending sheet. The display device further includes a plastic frame disposed between the casing part and the second bending sheet, wherein the panel is disposed between the casing part and the plastic frame, wherein the optical film is disposed between the plastic frame and the second bending sheet.

An end of the second bending sheet opposite to the end of the second bending sheet connected to the first bending sheet extends beyond the wall body to form a supporting flange. The optical film is disposed on a face of the second bending sheet that faces away from the first bending sheet, wherein a side edge of the optical film is stacked on the supporting flange. The panel is disposed on a face of the optical film that faces away from the second bending sheet, wherein a side edge of the panel is stacked on the supporting flange.

DETAILED DESCRIPTION

The back plate of the present disclosure is for use in a backlight module. In the preferred embodiment, the backlight module is for use in LCD display devices. In different embodiments, however, the backlight module is also available for use with keyboards, mobile phone button panels, billboards, and other devices using flat light source.

Figure 1:
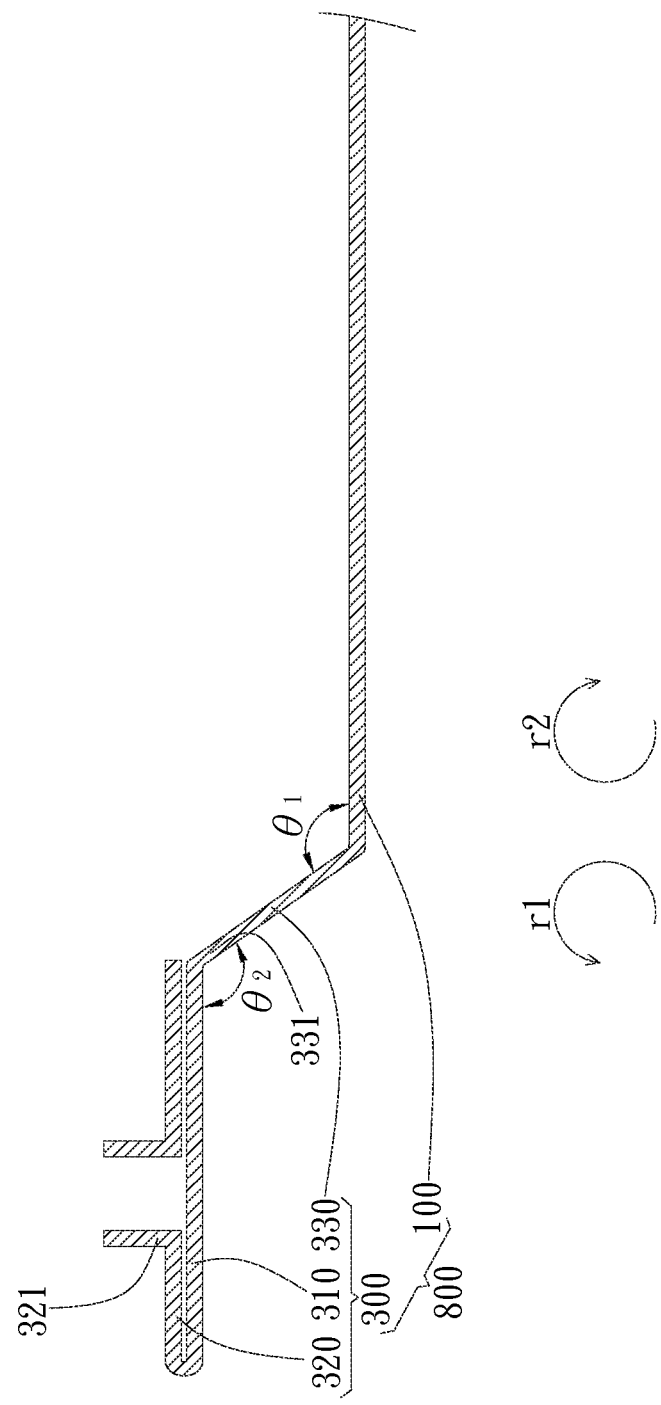
FIG. 1 is a schematic view of the present disclosure.

As the embodiment shown in FIG. 1, the back plate 800 of the present disclosure includes a plate 100 and a side wall 300. The side wall 300 extends out from an edge of the plate 100, wherein the side wall 300 includes a wall body 330, a first bending sheet 310, and a second bending sheet 320. A first angle $\theta_1$ is included between the wall body 330 and the plate 100, wherein the first angle $\theta_1$ is 90° or obtuse. The first bending sheet 310 is formed by bending outward from a top end 331 of the wall body 330 along a first rotating direction r1, wherein a second angle $\theta_2$ is included between the first bending sheet 310 and the wall body 330. The second angle $\theta_2$ is 90° or obtuse. The second bending sheet 320 is formed by bending an end of the first bending sheet 310 that is away from the top end 331 of the wall body 330 inward along a second rotating direction r2 contrary to the first rotating direction r1, wherein the second bending sheet 320 is substantially parallel to the first bending sheet 310 and at least a portion of the second bending sheet 320 overlaps the first bending sheet 310. Accordingly, the structure strength of the back plate 800 can be strengthened.

More particularly, in the preferred embodiment, the edge of the plate 100 is bent to form the wall body 330 along the second rotating direction r2 by plate bending or rolling, followed with bending the wall body 330 that connects with the plate 100 outward along the first rotating direction r1 to form the first bending sheet 310, and then bending the other end of the first bending sheet 310 connecting with the wall body 330 inward along the second rotating direction r2 to form the second bending sheet 320. The wall body 330, the first bending sheet 310, and the second bending sheet 320 together form the side wall 300. Taking a different point of view, the wall body 330 surrounds and stands on the edge of the plate 100 and forms a concave part with the plate 100. The upper edge of the wall body 300 extends outward to form the first bending sheet 310 and the second bending sheet 320 which are parallel and at least partially overlapped.

Figure 2A:
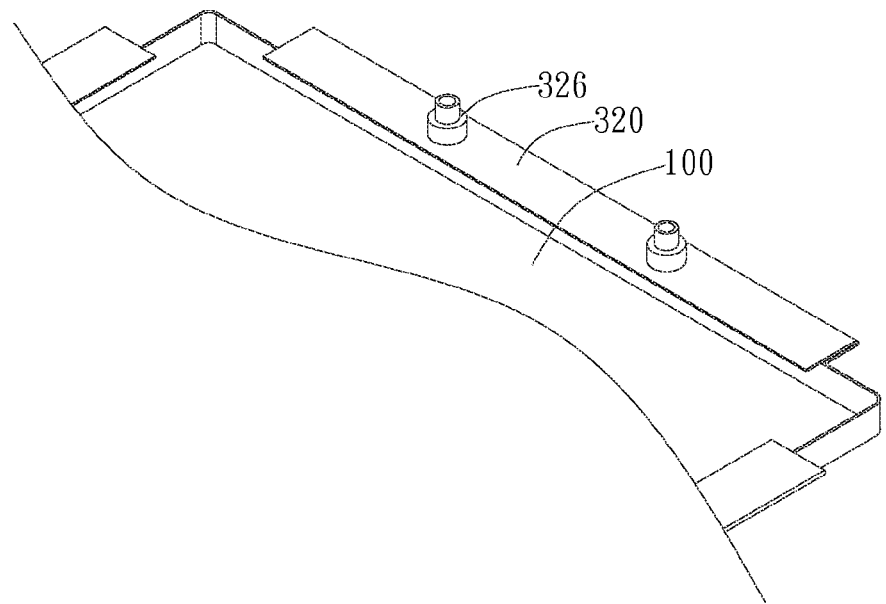
FIG. 2A is a schematic view of the present disclosure having a convex hull as the fixing part.
Figure 2B:
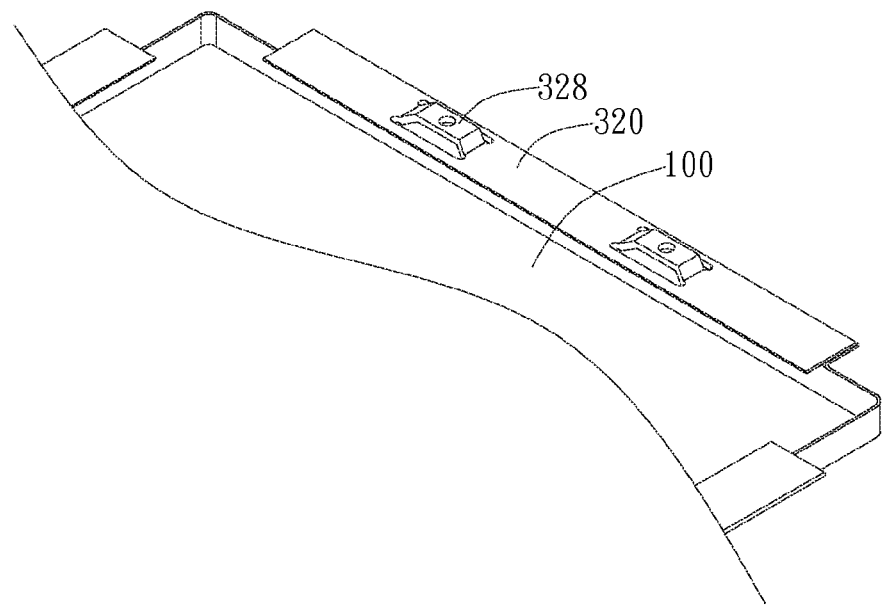
FIG. 2B is a schematic view of the present disclosure having an arch bridge as the fixing part.
Figure 2C:
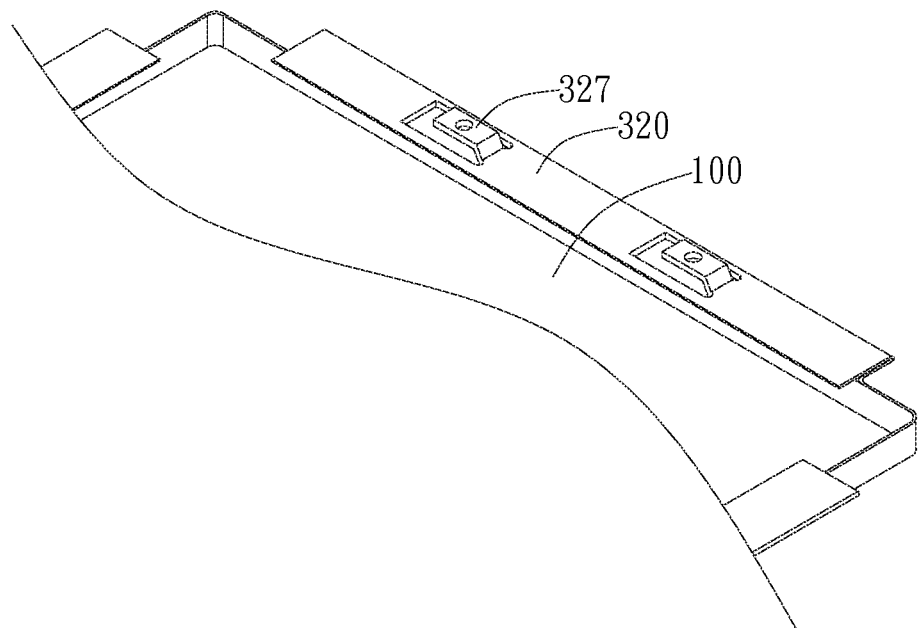
FIG. 2C is a schematic view of the present disclosure having an N-folding as the fixing part.

As the preferred embodiment shown in FIG. 1, the second bending sheet 320 includes a fixing part 321 disposed at the portion of the second bending sheet 320 overlapping the first bending sheet 310 and on a face of the second bending sheet 320 that faces away from the first bending sheet 310. As the preferred embodiment shown in FIG. 1, the fixing part 321 protrudes outward from the face of the second bending sheet 320 that faces away from the first bending sheet 310. The fixing part 321 is preferably a rivet hole for a rivet 329 to be inserted thereinto and fix the casing part 610 (see FIG. 5A) with the second bending sheet 320. In this manner, the back plate 800 of the present disclosure and the casing part 610 can be fixed together without using rivets driven into the back plate from the back side mentioned in prior arts. In other words, there won't be any riveting seen from the back side of the back plate, hence the aesthetic perception of the appearance of the back plate 800 of the present disclosure would be better. In different embodiments, to satisfy manufacturing or design requirements, the fixing part 321 could be a convex hull 326 shown in FIG. 2A, an arch bridge 328 shown in FIG. 2B, or an N-folding 327 shown in FIG. 2C.

Figure 3A:
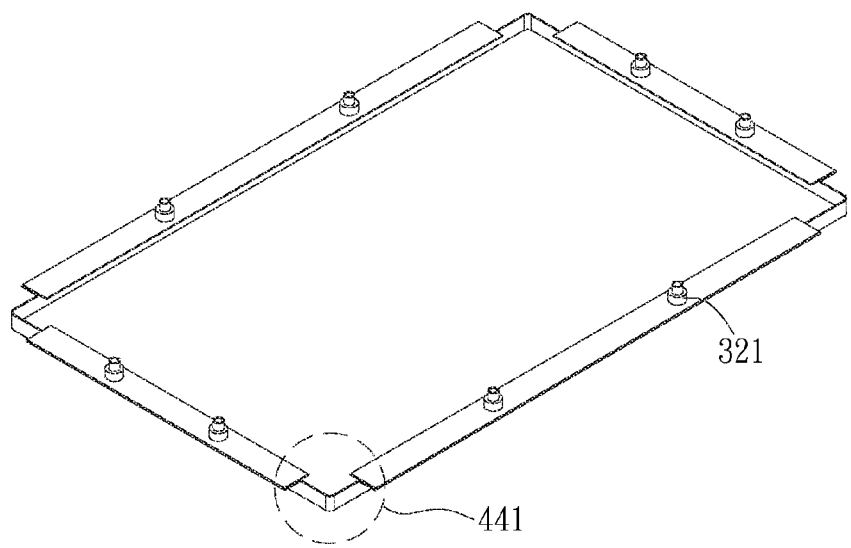
FIG. 3A is a schematic view of the present disclosure having a wall body surrounding the plate which is substantially a continuous wall.
Figure 3B:
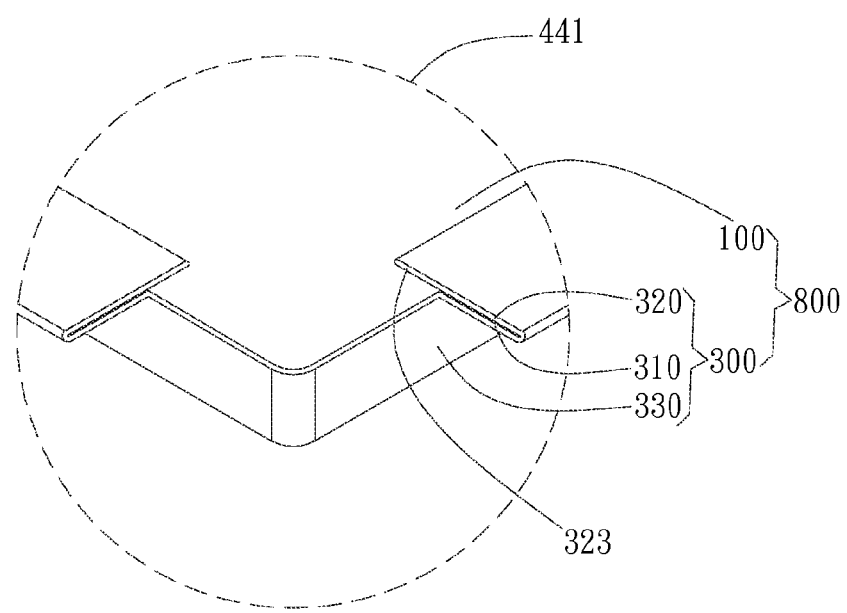
FIG. 3B shows a partially enlarged view of FIG. 3A.

As the preferred embodiment shown in FIGS. 3A and 3B, the wall body 330 is substantially a continuous wall surrounding the plate 100. Accordingly, the structure strength of the back plate 800 can be strengthened. Though the wall body 330 is a continuous wall, the outward extended first bending sheet 310 and second bending sheet 320 could be non-continuous as shown in FIGS. 3A and 3B to satisfy manufacturing or design requirements or to decrease manufacturing cost.

Figure 3C:
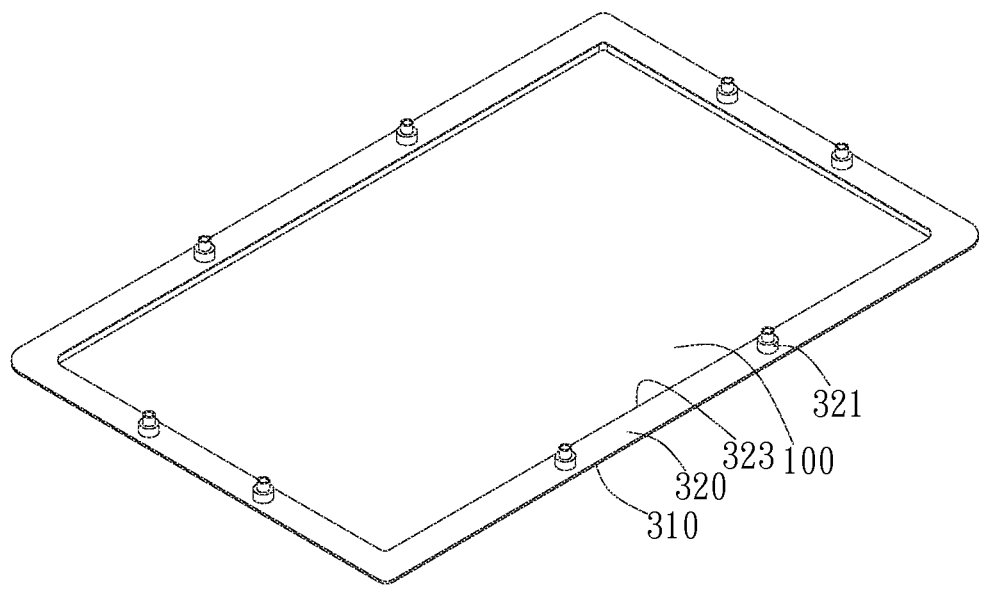
FIG. 3C is a schematic view of the present disclosure having continuous first bending sheet and second bending sheet.
Figure 4A:
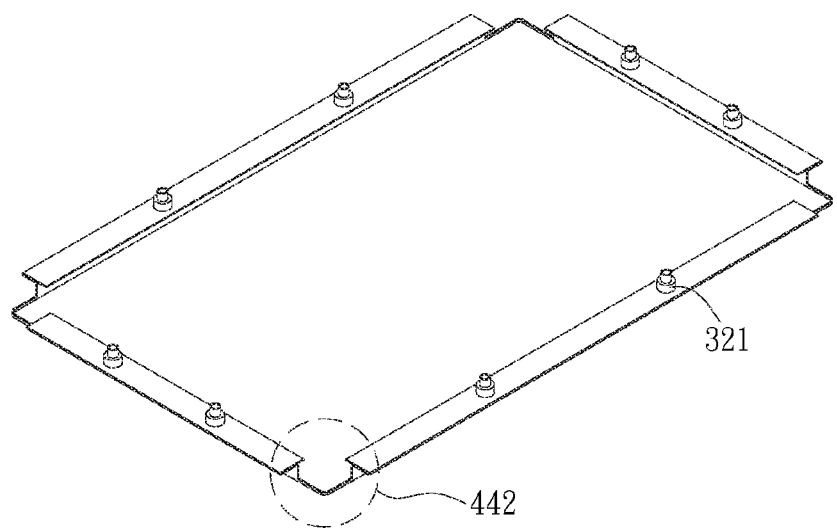
FIG. 4A is a schematic view of the present disclosure having a wall body constituted by non-continuous walls disposed in pair on two opposite sides of the plate which is formed.
Figure 4B:
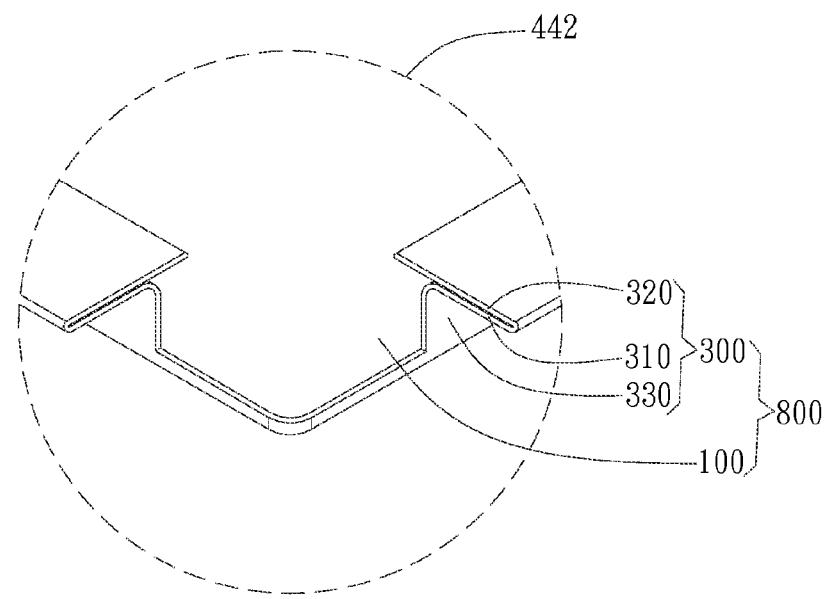
FIG. 4B shows a partially enlarged view of FIG. 4A.

In different embodiments, the outward extended first bending sheet 310 and second bending sheet 320 could be continuous as shown in FIG. 3C to strengthen the structure strength of the first bending sheet 310 and the second bending sheet 320. On the other hand, the wall body 330 could be non-continuous to satisfy manufacturing or design requirements or to decrease manufacturing cost. As a different embodiment shown in FIGS. 4A and 4B, the wall body 330 includes non-continuous walls disposed in pair on two opposite sides of the plate 100.

Figure 5A:
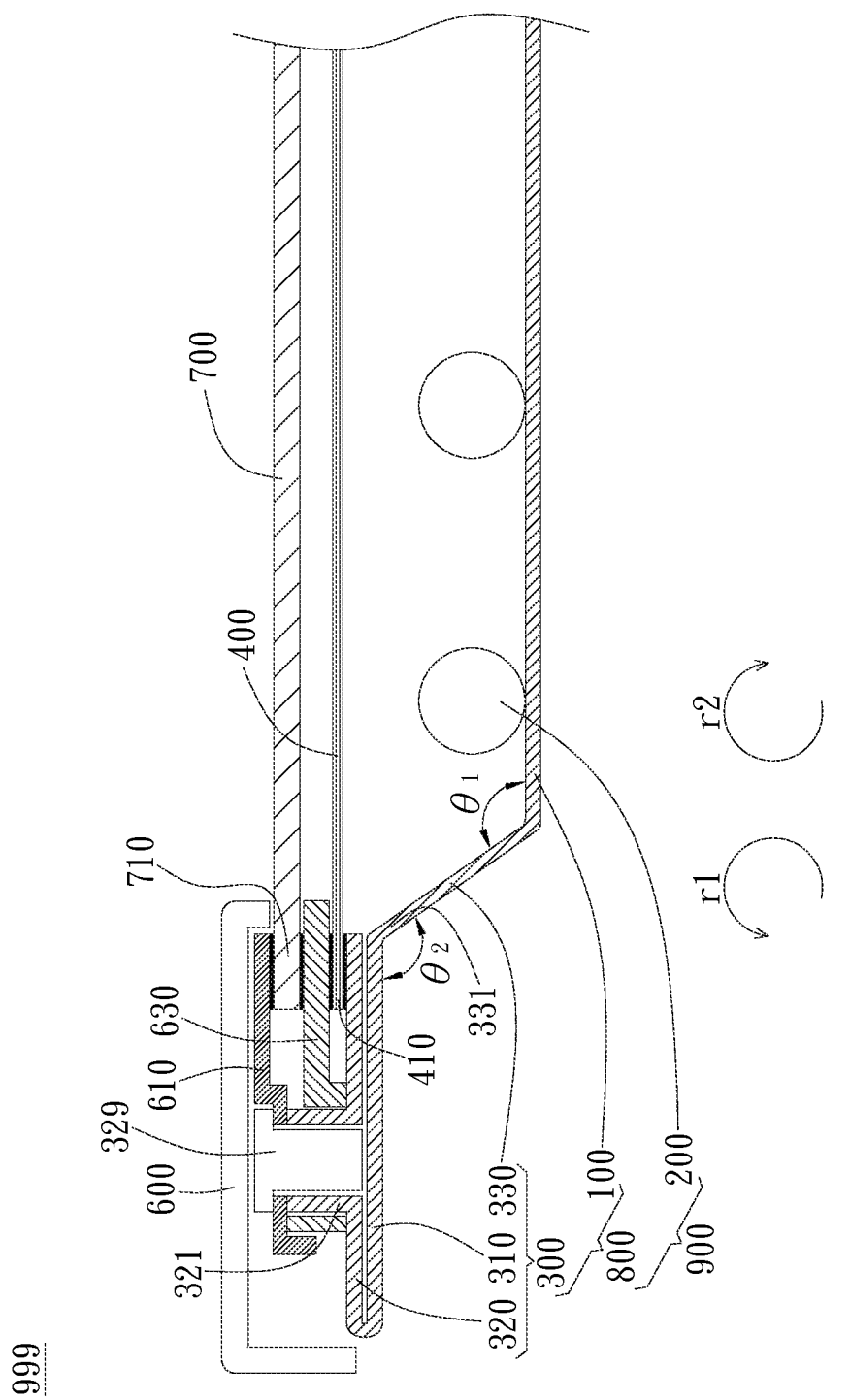
FIG. 5A is a schematic view of an embodiment of the present disclosure.

As an embodiment shown in FIG. 5A, the backlight module 900 of the present disclosure includes the back plate 800 and a light source module 200 disposed on the plate 100. The backlight module 900 further includes an optical film 400 disposed on a face of the second bending sheet 320 that faces away from the first bending sheet 310, wherein a side edge 410 of the optical film 400 extends outward and beyond the wall body 330. More particularly, the optical film 400 is disposed above the back plate 800, wherein its edge 410 extends outward from the center of the backlight module 900 and beyond the wall body 330, and is supported by the second bending sheet 320. The optical film could be a diffuser, a brightness enhancing film, a polarizing film, etc., wherein the number of the optical film is not limited to one.

As shown in FIG. 5A, the display device 999 of the present disclosure includes the backlight module 900 and a panel 700 disposed on a face of the optical film 400 that faces away from the second bending sheet 320, wherein a side edge 710 of the panel 700 extends outward and beyond the wall body 330. The display device 999 further includes a casing part 610 surrounding the back plate 800, wherein the casing part 610 is fixed on the second bending sheet 320 by the fixing part 321, wherein the panel 700 is disposed between the casing part 610 and the second bending sheet 320. The display device 999 further includes a plastic frame 630 disposed between the casing part 610 and the second bending sheet 320, wherein the panel 700 is disposed between the casing part 610 and the plastic frame 630, wherein the optical film 400 is disposed between the plastic frame 630 and the second bending sheet 320. More particularly, the panel 700 is disposed above the back plate 800 and the optical film 400, wherein the side edge 710 of the panel 700 extends outward and beyond the wall body 330 from the center of the backlight module 900. The side edge 710 of the panel 700 at least partially overlaps the side edge 410 of the optical film 400 with the plastic frame 630 interposed therebetween. By inserting the rivet 329 into the fixing part 321, the casing part 610 is fixed with the second bending sheet 320, wherein the side edge 710 of the panel 700, the plastic frame 630, and the side edge 410 of the optical film 400 disposed between the casing part 610 and the second bending sheet 320 are clamped and fixed. On the other hand, since the fixing part 321 is able to support the casing part 610, the height of the fixing part 321 can be modified to match the thickness of the panel 700 and the optical film 400 considering the design and manufacturing requirements. On the other hand, the display device 999 of the present disclosure further includes a front frame 600 disposed on the casing part 610 for preventing the exposure of units such as rivet 329.

Figure 5B:
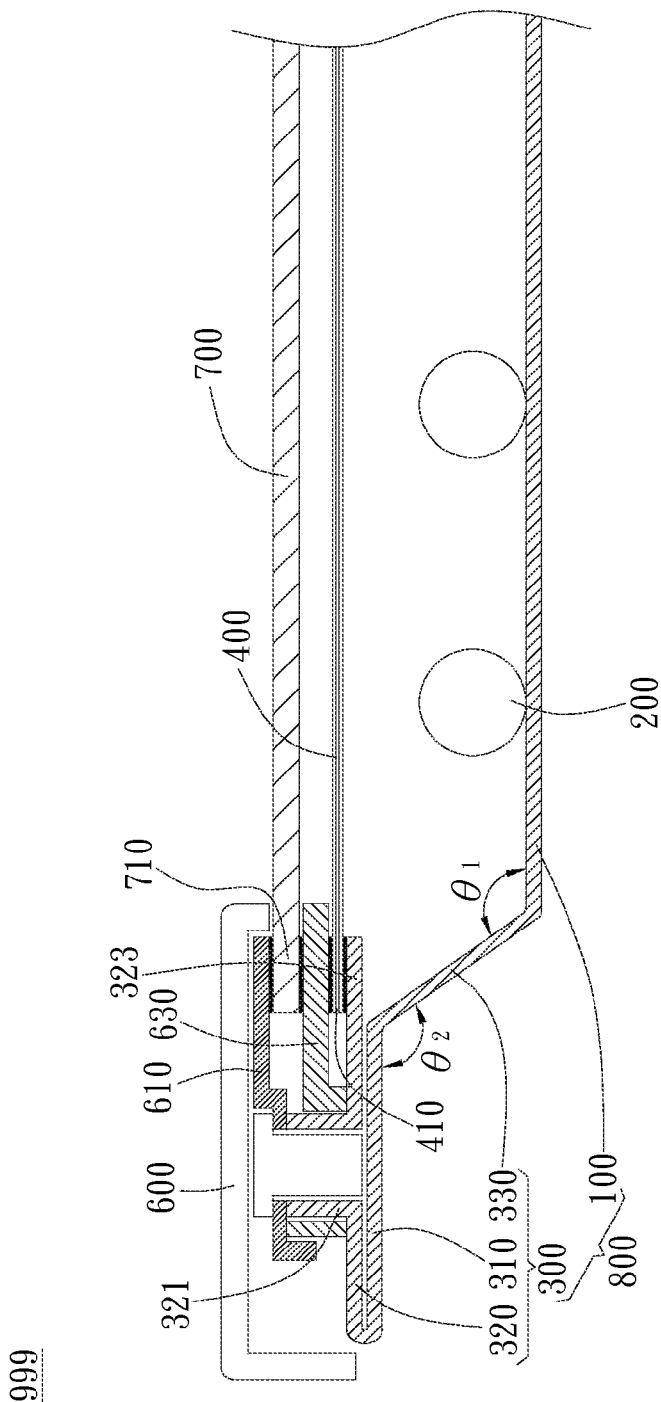
FIG. 5B is a schematic view of another embodiment of the present disclosure.

As the embodiment shown in FIG. 5B, an end of the second bending sheet 320 opposite to the end of the second bending sheet 320 connected to the first bending sheet 310 extends beyond the wall body 330 to form a supporting flange 323. In the embodiment, optical film 400 is disposed on a face of the second bending sheet 320 that faces away from the first bending sheet 310, wherein a side edge 410 of the optical film 400 is stacked on the supporting flange 323. The panel 700 of the display device 999 is disposed on a face of the optical film 400 that faces away from the second bending sheet 320, wherein a side edge 710 of the panel 700 is stacked on the supporting flange 323 and preferably does not extend beyond the wall body 330. For carrying same size of panel 700 and optical film 400, by disposing the supporting flange 323, the position of a wall body 330 can be disposed more outward to prevent an overlapping of the projections of a visible area and the wall body 330 in a direction vertical to the plate 100 and to decrease the abnormal of displaying. On the other hand, the supporting flange 323 is able to prevent light leakage.

Although the preferred embodiments of the present disclosure have been described herein, the above description is merely illustrative. Further modification of the disclosure herein disclosed will occur to those skilled in the respective arts and all such modifications are deemed to be within the scope of the disclosure as defined by the appended claims.

What is claimed is:

1. A back plate for use with a backlight module, comprising:
    a plate; and
    a side wall extending out from an edge of the plate, the side wall including:
        a wall body, wherein a first angle is included between the wall body and the plate;
        a first bending sheet formed by bending outward from a top end of the wall body along a first rotating direction, wherein the first bending sheet is substantially parallel to the plate, and a second angle is included between the first bending sheet and the wall body; and
        a second bending sheet formed by bending an end of the first bending sheet that is away from the top end of the wall body inward along a second rotating direction contrary to the first rotating direction, wherein the second bending sheet is substantially parallel to the first bending sheet and at least a portion of the second bending sheet overlaps the first bending sheet, wherein the second bending sheet includes a fixing part disposed at the portion of the second bending sheet overlapping the first bending sheet and on a face of the second bending sheet that faces away from the first bending sheet,
    wherein the wall body is substantially a continuous wall surrounding the plate or includes non-continuous walls disposed in pair on two opposite sides of the plate.

2. The back plate of claim 1, wherein the fixing part protrudes outward from the face of the second bending sheet that faces away from the first bending sheet.

3. The back plate of claim 1, wherein the first angle is 90° or obtuse.

4. The back plate of claim 1, wherein the second angle is 90° or obtuse.

5. The back plate of claim 1, wherein an end of the second bending sheet opposite to where the end of the second bending sheet is connected to the first bending sheet extends beyond the wall body to form a supporting flange.

6. A backlight module, comprising:
    the back plate of claim 1; and
    a light source module disposed on the plate.

7. The backlight module of claim 6, further comprising an optical film disposed on a face of the second bending sheet that faces away from the first bending sheet, wherein a side edge of the optical film extends outward and beyond the wall body.

8. A display device, comprising:
    the backlight module of claim 7; and
    a panel disposed on a face of the optical film that faces away from the second bending sheet, wherein a side edge of the panel extends outward and beyond the wall body.

9. The display device of claim 8, further comprising a casing part surrounding the back plate, wherein the casing part is fixed on the second bending sheet by the fixing part, wherein the panel is disposed between the casing part and the second bending sheet.

10. The display device of claim 9, further comprising a plastic frame disposed between the casing part and the second bending sheet, wherein the panel is disposed between the casing part and the plastic frame, wherein the optical film is disposed between the plastic frame and the second bending sheet.

11. A backlight module, comprising:
    the back plate of claim 5; and
    a light source module disposed on the plate.

12. The backlight module of claim 11, further comprising an optical film disposed on a face of the second bending sheet that faces away from the first bending sheet, wherein a side edge of the optical film is stacked on the supporting flange.

13. A display device, comprising:
    the backlight module of claim 12; and
    a panel disposed on a face of the optical film that faces away from the second bending sheet, wherein a side edge of the panel is stacked on the supporting flange.

14. The display device of claim 13, further comprising a casing part surrounding the back plate, wherein the casing part is fixed on the second bending sheet by the fixing part, wherein the panel is disposed between the casing part and the second bending sheet.

15. The display device of claim 14, further comprising a plastic frame disposed between the casing part and the second bending sheet, wherein the panel is disposed between the casing part and the plastic frame, wherein the optical film is disposed between the plastic frame and the second bending sheet.

* * * * *